United States Patent [19]

Lin

[11] Patent Number: 4,600,570
[45] Date of Patent: Jul. 15, 1986

[54] CONTINUOUS CONTROLLED PROCESS FOR REMOVING SULPHUR OXIDES GASES FROM STACK GASES

[76] Inventor: Ping-Wha Lin, 506 S. Darling St., Angola, Ind. 46703

[21] Appl. No.: 743,032

[22] Filed: Jun. 10, 1985

[51] Int. Cl.$^4$ .......................... B01J 8/00; C01B 17/00
[52] U.S. Cl. .................................... 423/244; 423/242; 422/62
[58] Field of Search .......... 423/242 A, 244 A, 242 R, 423/244 R; 422/62

[56] References Cited

U.S. PATENT DOCUMENTS

| | | | |
|---|---|---|---|
| 3,781,408 | 12/1973 | Lin | 423/244 |
| 3,855,125 | 12/1974 | Lin | 210/46 |
| 3,861,930 | 1/1975 | Lin | 106/109 |
| 4,054,463 | 10/1977 | Lin | 106/97 |
| 4,171,951 | 10/1979 | Lin | 432/77 |
| 4,229,411 | 10/1980 | Kisters et al. | 422/62 |
| 4,293,521 | 10/1981 | Isahaya et al. | 422/62 |
| 4,322,224 | 3/1982 | Roth | 422/62 |
| 4,387,078 | 6/1983 | Lin | 423/244 |
| 4,470,921 | 9/1984 | Lin | 252/189 |
| 4,482,096 | 11/1984 | Lin | 241/65 |

OTHER PUBLICATIONS

"SO$_x$ Removal and Acid Neutralization With Its By-Product", by Ping-Wha Lin, Environmental Science and Technology, vol. 12, p. 1081, Sep. 1978.
"Hydration Enhanced Sulfation of Limestone and Dolomite in the Fluidized-Bed Combustion of Coal", by S. A. Shearer et al., APCA Journal, vol. 30, No. 6, Jun. 1980.

Primary Examiner—Gregory A. Heller
Attorney, Agent, or Firm—Larry J. Palguta

[57] ABSTRACT

A process for effecting the continuous desulphurization of stack gases includes a double loop computerized system (10) for continuously effecting the desulphurization. The stack gases are passed through heat exchangers (14, 15) to raise the temperature to approximately 700° F., the first heat exchanger (14) receiving hot desulphurized exit gas from a reactor (27) and the second heat exchanger (15) receiving preheated SO$_3$ rich flue gases from a catalytic converter (17). The stack gases heated to 700° F. are passed through a preheater burner (16) to increase the temperature to about 850° F. and then transmitted through the catalytic converter (17) to convert most of the sulphur dioxide to sulphur trioxide. The sulphur trioxide rich flue gas is recirculated through the second heat exchanger (15) in order to cool the flue gas, and then fed to the reactor (27) which receives either calcium oxide, calcium carbonate, or both in order to effect SO$_x$ removal. The reaction product(s) is quenched to crack the outer shell of calcium sulphate, and then may be selectively resupplied to the reactor (27) or to storage (21, 51). A computerized controller (50) responds to a probe (40) to selectively control the supply of the calcium oxide, calcium carbonate, and resupply of reaction products to the reactor (27). Desulphurized exit gas from the reactor (27) passes through the first heat exchanger (14) for cooling and then through a particle separator (30) before exiting the system (10).

24 Claims, 4 Drawing Figures

CONTINUOUS CONTROLLED PROCESS FOR REMOVING SULPHUR OXIDES GASES FROM STACK GASES

BACKGROUND OF THE INVENTION

The present invention relates to a double loop continuous desulphurization process for removing sulphur oxides from stack gases.

In my previous patent applications, I have disclosed and provided improved materials for desulphurization and which are described by the coined term "Linfan" Linfan comprises a core of porous unspent lime which is surrounded by a cracked shell of calcium sulphate. This material is advantageously recycled and reused for desulphurization.

The purpose of the double loop continuous process for desulphurization of sulphur oxides rich flue gas, is to increase the efficiency of $SO_x$ removal according to my processes which utilize lime, limestone, Linfan and a new product Lintune, and to demonstrate the capability of the process to remove sulphur dioxide at a cost considerably less than previously experienced. The reaction products produced are primarily Linfan and a further new material having a core of porous limestone or calcium carbonate with a cracked outer coating or shell of calcium sulphate and which is usable for desulphurization, and which shall be known as "Lintune". These products, Linfan and Lintune, have diversified uses, including uses in such things as highway construction, sewage treatment, concrete pipe manufacture and other concrete structure construction, raw material for cement manufacture, and soil conditioner in addition to their recyclable use for $SO_x$ removal.

SUMMARY OF THE INVENTION

The double loop continuous desulphurization process comprises passing a continuous flow of stack gases through a solids removal system (bag house or high efficiency electrostatic precipitator) and a two stage heat exchanger which increases the temperature of the stack gases to approximately 700° F. The heated stack gases are then transmitted through a preheater which further heats the stack gases to 850° F., and then transmitted through a catalytic converter to convert the $SO_2$ in the stack gases to sulphur trioxide which is then recirculated through the second stage of the heat exchanger to effect heating of the inflow of the stack gases. The sulphur trioxide rich flue gas is passed from the second part of the heat exchanger to the reactor for reaction with calcium oxide or calcium carbonate. The reaction product is continuously fed to a quenching chamber connected to vacuum means for removing the reaction product from the reactor. The quenched reaction product comprises Linfan or Lintune which is then either fed directly back to the reactor for further desulphurization or supplied to a storage unit. A computerized controller includes a probe which continuously senses the presence of sulphur dioxide and trioxide within the reactor, and responsively thereto controls the removal rate of the reaction product from the reactor to the quenching chamber and also the supply rate of calcium oxide or calcium carbonate, and Linfan or Lintune to the reactor. The cleansed stack gases or exit gases are emitted continuously from the reactor through a cyclone separator and to the first stage of the heat exchanger to cool the exit gases and heat the inflow of stack gases, and then passed through a particle separator before exiting the system.

An alternative method for the double loop desulphurization process utilizes a two stage reactor with calcium carbonate supplied to the upper stage and calcium oxide supplied to the lower stage of the reactor. The computerized controller operates responsively to the probe which senses the level of sulphur dioxide and trioxide within the reactor, and controls the supply of calcium oxide and calcium carbonate fed to the reactor. The solid reaction products from the two stage reactor are withdrawn through valves and into quenching chambers which produce the reaction products Linfan and Lintune that are then cycled either to respective storage units or to feeding mechanisms so that each reaction product may be resupplied, as needed, to the reactor.

BRIEF DESCRIPTION OF THE DRAWINGS

FIG. 3 is a cross sectional view of Linfan; and

FIG. 4 is a cross sectional view of Lintune.

DETAILED DESCRIPTION OF THE INVENTION

Figure 1:
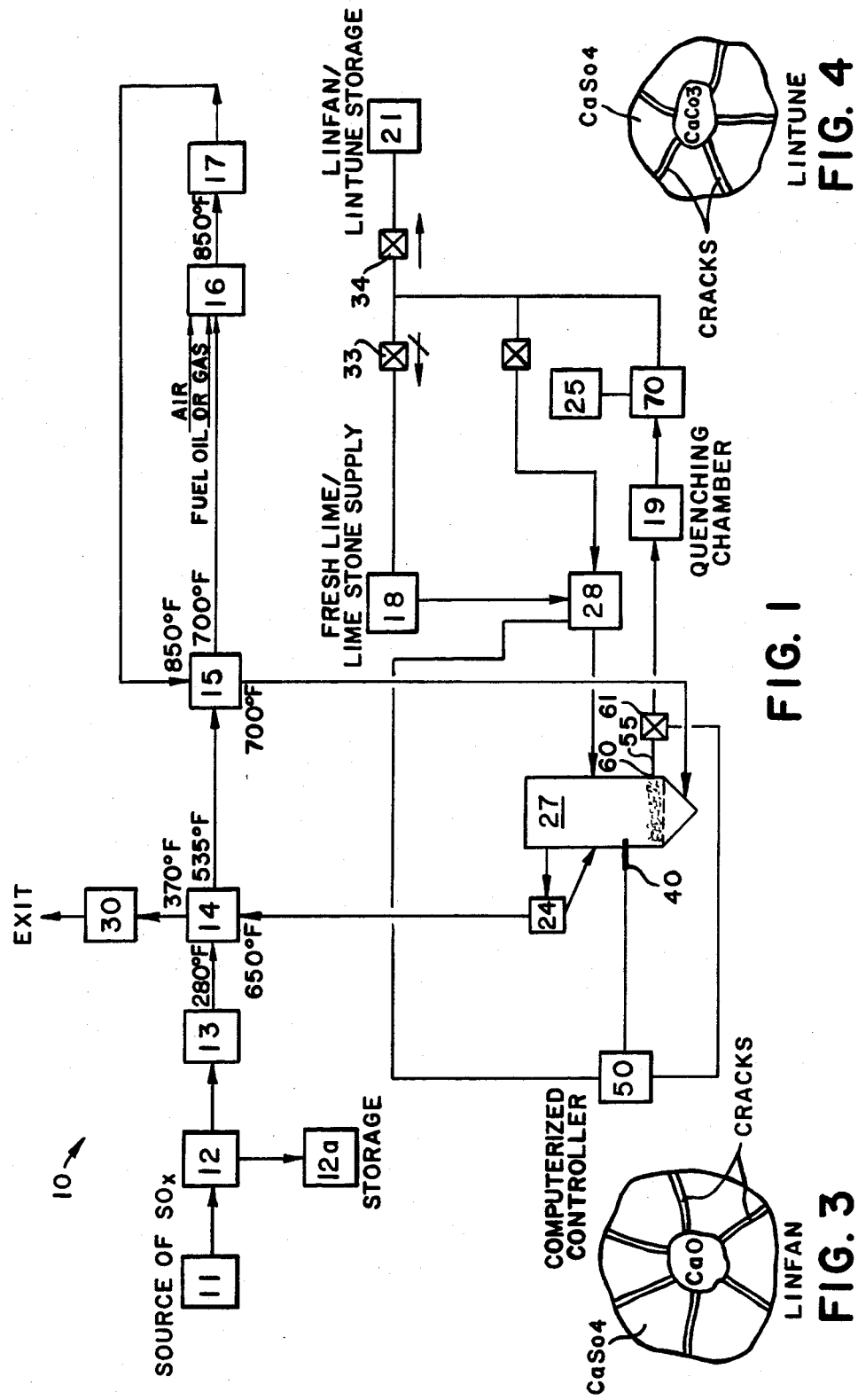
FIG. 1 illustrates the double loop, continuous desulphurization process and apparatus for $SO_x$ removal.

Referring to FIG. 1, there is illustrated a flow diagram for a power plant continuous desulphurization process system designated generally by reference numeral 10. The double loop continuous desulphurization process illustrated in the flow diagram may be utilized with a coal fired utility boiler commonly in use today throughout the United States. The stack gases from power plants normally have a temperature of about 280° F. The stack gases containing sulphur oxides ($SO_2$ and $SO_3$) flow from a source 11 to a solids removal system which can be a high efficiency electrostatic precipitator, a bag house, or a combination of an electrostatic precipitator and a bag house. FIG. 1 shows stack gases flowing to an electrostatic precipitator 12 (connected to fly ash storage 12a) and then to a bag house 13 for removal of any remaining solids. Electrostatic precipitator 12 is a conventional precipitator. The solids concentration in the stack gases supplied to bag house 13 is expected to be quite low. Thus, a relatively small bag house is sufficient for proper functioning of the system. The removal of solids by bag house 13 prevents any fly ash build up in the catalytic converter 17 and also provides for better heat transfer at heat exchangers 14 and 15.

The $SO_x$ removal system 10 can be subdivided into the following sub-systems:

1. Stack Gas Reheat and Heat Recovery System:

This system is designed to bring the stack gases from a temperature of 280° F. at the electrostatic precipitator 12 outlet to 850° F. prior to entering the catalytic converter 17. The heat exchangers 14 and 15 recover approximately 420° F. of sensible heat from the flue gas exiting the reactor 27 and cyclone 14 and the sulphur trioxide rich flue gases leaving converter 17. This results in the overall requirement for heat added by preheating being reduced to about 150° F. of sensible heat.

In operation, the temperature of the stack gases is adjusted from 280° F. to about 535° F. by the gas heat exchanger 14 and then to about 700° F. by gas heat exchanger 15. The temperature of the stack gases is then further elevated to approximately 850° F. by the external preheat burner 16. The stack gases pass through the preheat burner 16 to elevate the temperature to approximately 850° F. prior to entry into catalytic converter 17.

2. Catalytic Conversion System:

After adjusting the stack gas temperature to approximately 850° F., the stack gas enters catalytic converter 17 where $SO_2$ gas combines with oxygen in the presence of a catalyst such as vanadium pentoxide to form sulphur trioxide ($SO_3$) according to the following formula:

$$SO_2 + \tfrac{1}{2}O_2 \rightarrow SO_3$$

This system is designed to convert at least 90 percent of the sulphur dioxide to sulphur trioxide by the exothermic reaction with oxygen. The heat generated by this reaction, approximately 1300 BTU/Lb. sulphur, helps offset heat losses from equipment and flues. Because the bag house 13 has almost 100 percent solids removal efficiency, there will be no gradual build-up of fly ash in the converter 17 and, therefore, no gradual increase in pressure drop across the unit over a long period of time. Also, any slight fly ash build-up would not effect the conversion efficiency of the catalyst.

3. $SO_X$ Removal System:

The flue gas rich in sulphur trioxide ($SO_3$) from catalytic converter 17 flows through the gas heat exchanger 15 where it is cooled to approximately 700° F. and then into the reactor 27 where it reacts with fluidized lime particles. The following reactions take place in the reactor 27:

$$SO_3(g) + CaO(s) \rightarrow CaSO_4(s) \quad \Delta H = -96 \text{ KCal/mole}$$

or $$SO_3(g) + H_2O(g) \rightarrow H_2SO_4(g)$$

$$H_2SO_4(g) + CaO(s) \rightarrow CaSO_4(s) + H_2O(g)$$

The catalytically unconverted sulphur dioxide reacts with lime in the oxidized reactor environment according to the following formula:

$$SO_2 + \tfrac{1}{2}O_2 + CaO \rightarrow CaSO_4(s)$$

Because the flue gas contains $CO_2$, in the presence of $SO_3$ the following reactions also take place:

$$CO_2(g) + CaO(s) \rightarrow CaCO_3(s)$$

$$CaCO_3(s) + SO_3(g) \rightarrow CaSO_4(s) + CO_2$$

All of the aforementioned reactions occur on the surface of the lime particles in the reactor. As a result, solid particles, characterized by a composition having a core of lime coated with calcium sulphate ($CaSO_4$), are formed. The reaction between $SO_x$ and lime particles is governed by gas diffusion. As the thickness of the calcium sulphate coating of the particle increases, the diffusion of the gas through the calcium sulphate coating in order to react with lime in the core becomes increasingly difficult. The particles are then considered exhausted and require regeneration.

The solid particles in the reactor are continuously withdrawn and quenched or regenerated in the quenching chamber 19 which will be described in further detail below. The regenerated particle, Linfan (FIG. 3), is continuously fed into the reactor by the feeding unit 28, the reactor 27 being replenished occasionally with fresh lime from lime/limestone supply unit 18. FIG. 1 illustrates the process and system utilizing a reactant of either lime or limestone.

The fluidized lime reactor 27 is designed to operate at a temperature above 500° F. However, in power plant applications it is about 700° F. and is operated on a continuous basis. The reactor is equipped with $SO_x$ probes 40 and a computerized controller 50 which controls lime and/or Linfan feeding rates and the withdrawal rate of the exhausted reaction particles through line 55, to effect 100 percent or nearly 100 percent $SO_3$ removal efficiency.

The flue gases from catalytic converter 17 and heat exchange 15 are rich in sulphur trioxide and carbon dioxide, and are distributed uniformly in the fluidized lime reactor 27. It should be clearly understood that the reactor 27 could be either a single stage or two-stage reactor.

The emitting or exit gas from reactor 27 may carry some attrited particles, and these particles are separated from the gas by a cyclone separator 24 and returned to the reactor 27. The cleansed exit gas then passes through the gas heat exchanger 14 and bag house 30 (which is optional) before exiting the system 10. Because the solids loading in the exit gas from the reactor is low, the size of bag house 30 need not be excessive. After passing through bag house 30, the plant exit gas is almost completely free of dust and $SO_x$.

As an alternative to supplying lime, FIG. 1 also illustrates that limestone (calcium carbonate) can be provided as a reactant in reactor 27. The flue gas to be treated should be rich in $SO_x$. If limestone is used, the carbon dioxide in the flue gas has no reaction with calcium carbonate and the $SO_3$ reacts with $CaCO_3$ according to the following formula:

$$SO_3(g) + CaCO_3(s) \rightarrow CaSO_4(s) + CO_2(g)$$

to form a $CaSO_4$ coating. $SO_2$ has very low reactivity with $CaCO_3$. However, at a temperature above 95° C., it is absorbed by calcium carbonate as sulphate. The calcium sulphate coating of the hot reaction particles can be cracked by quenching in the quenching chamber 19 and recycled back to the reactor 27 via feeding unit 28 for further desulphurization. Without surface cracking, desulphurization by diffusion becomes increasingly difficult as the thickness of the coating grows. The surface cracked calcium sulphate coated calcium carbonate is shown in FIG. 4 and is given the coined name "Lintune".

Figure 2:
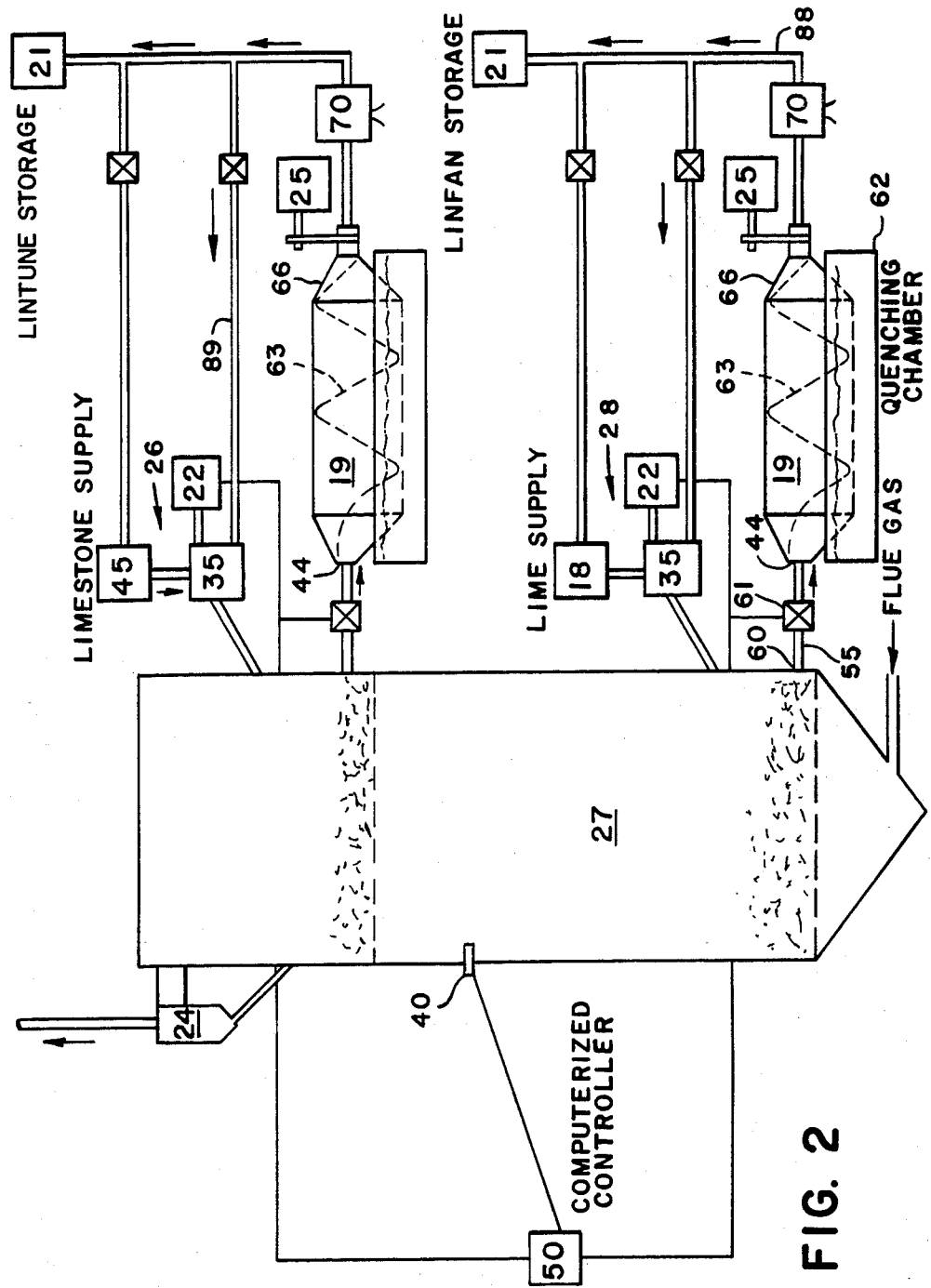
FIG. 2 illustrates an enlarged partial view of FIG. 1 and with a two-stage reactor receiving both limestone and lime.

FIG. 2 illustrates an alternative means for effecting desulphurization by the double loop desulphurization process system 10. Reactor 27 is a two-stage reactor. The reactant used in the upper stage of the reactor is limestone which has no reaction with carbon dioxide in the gas from the lower stage. The use of limestone in the upper stage is designed to insure complete $SO_3$ removal. If the computerized controller 50 provides the capability to control the process and achieve one hundred percent $SO_3$ removal at the lower stage of the reactor, the upper stage can be omitted in a commercialized full scale unit. However, if the supply of limestone is desired for a two-stage reactor 27, the two-stage reactor includes an $SO_x$ probe 40, as shown in FIG. 2, which sends a signal to computerized controller 50 when sulphur dioxide or trioxide is detected in the gas above the lime bed. Controller 50 controls individually the supply of limestone from limestone supply 45 and Lintune via line 89 to the upper stage of reactor 27 by means of associated feeding unit 26. The controller 50 also sends an individual command signal to another feeding unit 28 comprising a motor 22 which engages the screw feeder 35 by electromagnetic coupling or mechanical coupling. If preheating of the reactant is required, electric heating tape or other means can be used to heat the reactants in feeding units 26, 28. The feeding units may comprise similar components for the supply of reactants and recycling of reaction products to reactor 27. Motors 22 and screw feeders 35 include differential gears which cause the feeders to deliver fresh lime, limestone, recycled Linfan and/or Lintune at desirable rates to the respective stages of the reactor. This alternative process would employ the same quenching, resupply of reaction products, and storage mechanisms, for each of the reactants as illustrated in FIG. 2.

4. Quenching System:

The hot reaction particles from reactor 27 are transported pneumatically through the discharge port 60, line 55, and gate valve 61 (see FIG. 1), and continuously fed into a specially designed quenching chamber 19 where the calcium sulphate shells of the solid reaction particles are cracked by thermal shock. FIGS. 3 and 4 show the cross section view of the surface cracked solid reaction particles Linfan and Lintune, respectively. Linfan or Lintune is continuously withdrawn from the quenching chamber 19 by a vacuum pump 70 or other pneumatic conveying system and fed to either the feeding unit 28 or the Linfan/Lintune storage unit 21 (see FIG. 1). Valves 33 and 34 prevent entry of the Linfan into lime/limestone storage unit 18 and permit entry into Linfan/Lintune supply unit 21.

As illustrated in detail in FIG. 2, the quenching chamber 19 is a closed tank rotating about a horizontal axis and partly submerged in water within a water container 62. The hot gas and calcium sulphate coated reaction particles are cooled by indirect cooling wherein heat is transmitted through the metal of the quenching tank to the water. The quenched reaction particles are removed from the quenching tank by the vacuum pump 70 and sent to the feeding unit 28 or reaction particle Linfan/Lintune storage unit 21.

The outlet line 55 and gate valve 61 feed into quenching chamber 19 such that at 44 there is a slight gap which allows a small amount of air to be sucked into quenching chamber 19. Because reactor 27 operates under pressure, the vacuum pump 70 or other pneumatic conveying system is able to withdraw by means of vacuum the quenched reaction product from chamber 19 into line 88 for appropriate transmission.

The hot calcium sulphate coated reaction particles travel in quenching chamber 19 in a spiral path guided by a thin steel plate 63 welded to the inside wall of the quenching chamber. Quenching chamber 19 may be driven by a motor and pulley system 25 (or motor and gear system) or by any other suitable means and the system 25 may be controlled by controller 50. The angular velocity of the quenching tank ranges from two revolutions per minute to thirty revolutions per minute. The quenching tank is made of brass, reinforced copper, or other high heat conductive, noncorrosive material. Optionally, quenching chamber 19 can be slightly sloped and the degree of inclination would be about 15°. Under the influence of gravity and vacuum applied by vacuum pump 70, the reaction particles travel slowly to the vacuum end 66. Vacuum pump 70 can be of a variable speed type and creates a vacuum pressure in the quenching chamber from 1 to 6 inches depending on the size of the chamber and the amount of the particles handled per unit of time. The residence time of the powder in the quenching chamber is at least one minute, preferably above two minutes.

As illustrated by FIG. 2, the quenching of the solid reaction particles comprising calcium carbonate coated with calcium sulfate may be accomplished by the same type of quenching system.

The double loop desulphurization process is a completely dry $SO_x$ removal process, operating on a continuous basis and computer controlled. The system is fully automated and controlled by the computer. The double loop desulphurization system would have the capability to remove all $SO_x$ from the flue gas, and to control the composition of the product or products, Linfan or Lintune, for meeting any desirable requirements and specifications. Because the chemical reactions in the fluidized lime reactor are exothermic, no external heat is required to maintain the reactor at operation temperature. It is expected, however, that there would be a drop of about 50° F. at the upper stage of a two-stage reactor in order to meet the heating requirement of any recycled Linfan, Lintune, or freshly added lime. Because the temperature of the system is maintained above the dew point of sulfuric acid, the system is free from corrosion.

The above described lime reactors were found not to be effective in $NO_x$ removal in previous studies, which indicates that Linfan is a relatively pure product consisting of mainly unspent lime in a porous core with a cracked calcium sulphate coating. $NO_x$ can be controlled by combustion modification such as reduced air preheat operation, load reduction, modification of combustion facilities, etc.

Although the present invention has been illustrated and described in connection with a few selected examples and embodiments, it will be understood that they are illustrative of the invention and are by no means restrictive thereof. It is reasonable to expect that those skilled in this art can make numerous revisions and adaptations of the invention and it is intended that such revisions and adaptations are included within the scope of the following claims as equivalents of the invention. The process can be used to treat flue gas containing $SO_2$ received from facilities such as a roaster, smelter, sulfuric acid plants, etc.

What is claimed is:

1. A process for effecting the continuous efficient desulphurization of gases containing sulphur oxides, comprising the steps of:

passing a flow of flue gas containing sulphur oxides gases through heat exchanging means to change the temperature thereof, transmitting the heated flue gas through preheating means in order to further increase the temperature thereof, passing the further heated flue gas through catalytic converter means in order to convert the sulphur dioxide therein to sulphur trioxide and resulting in a sulphur trioxide rich flue gas, communicating the sulphur trioxide rich flue gas to said heat exchanging means in order to heat the incoming flue gas and cool the sulphur trioxide rich flue gas, transmitting the sulphur trioxide rich flue gas to a reactor and providing a calcium containing reactant to the reactor, withdrawing the reaction product of the reactant and sulphur oxides, quenching said reaction product to effect a porous core of unreacted reactant in an outer shell of cracked calcium sulphate, resupplying the quenched reaction product to the reactor for additional reaction with sulphur oxides within the core region of the reaction product, continuously emitting a desulphurized exit gas from said reactor to said heat exchanging means in order to effect the change in temperature of said incoming flue gas, and transmitting said desulphurized exit gas to an exit.

2. The process for effecting continuous efficient desulphurization in accordance with claim 1, wherein the reactant comprises one of calcium oxide and calcium carbonate.

3. The process for effecting continuous efficient desulphurization in accordance with claim 1, further comprising the step of passing said flue gas through an electrostatic precipitator and solid particle collection means prior to passing the flue gas through said heat exchanging means.

4. The process for effecting continuous efficient desulphurization in accordance with claim 1, wherein said preheater receives air and fuel for preheating said further heated flue gas prior to entry into the catalytic converter means.

5. The process for effecting continuous efficient desulphurization in accordance with claim 1, further comprising the steps of passing said desulphurized exit gas through cyclone separator means after leaving the reactor and through solid particle collection means after leaving said heat exchanging means.

6. The process for effecting continuous efficient desulphurization in accordance with claim 1, further comprising the steps of automatically controlling the withdrawal of the reaction product from said reactor and automatically controlling the resupplying of said quenched reaction product to the reactor by means of a computerized controller.

7. The process for effecting continuous efficient desulphurization in accordance with claim 6, further comprising the step of automatically controlling the supplying of reactant to the reactor which comprises a multistage reactor, the reactant comprising calcium oxide and calcium carbonate with each supplied to a respective stage of the reactor.

8. The process for effecting continuous efficient desulphurization in accordance with claim 6, further comprising the step of automatically controlling the supplying of reactant to the reactor by means of the computerized controller.

9. The process for effecting continuous efficient desulphurization in accordance with claim 6, wherein the computerized controller includes probe means for determining the presence of a sulphur oxide within said reactor.

10. The process for effecting continuous efficient desulphurization in accordance with claim 9, wherein the heat exchanging means comprises a first heat exchanger and a second heat exchanger, the first heat exchanger receiving and cooling the desulphurized exit gas and providing a first heating of the incoming flue gas to increase the temperature thereof, and the second heat exchanger providing the cooling of the sulphur trioxide rich flue gas and providing a second heating of the flue gas to increase the temperature thereof.

11. The process for effecting continuous efficient desulphurization in accordance with claim 1, further comprising the step of providing subatmospheric pressure for effecting the withdrawal of said reaction product to means for temperature quenching the reaction product.

12. The process for effecting continuous efficient desulphurization in accordance with claim 11, further comprising the step of transporting said reaction product through the temperature quenching means by means of gravity and subatmospheric pressure, the quenching means including an inclination to effect said transport by gravity.

13. The process for effecting continuous efficient desulphurization in accordance with claim 11, wherein the quenching means comprises a rotatably movable cylinder at least partially submerged in a cooling medium.

14. The process for effecting continuous efficient desulphurization in accordance with claim 13, wherein the quenching means includes a spiral path which guides the reaction product through the quenching means.

15. A process for effecting the continuous and efficient desulphurization of gases containing sulphur oxides, comprising the steps of:

supplying and transmitting an inflow of flue gas containing sulphur oxides gases through heat exchanger means for changing the temperature thereof, transmitting the heated flue gas through preheating means to further heat the flow of flue gas, and passing the inflow of preheated flue gas through a catalytic converter to provide heated sulphur trioxide rich flue gas, passing the heated sulphur trioxide rich flue gas through the heat exchanger means in order to cool the sulphur trioxide rich flue gas and increase the temperature of the inflow of flue gas, communicating the cooled sulphur trioxide rich flue gas to a two-stage reactor, continuously sensing the presence of a sulphur oxide within the reactor and in accordance therewith selectively supplying calcium carbonate to an upper stage and calcium oxide to a lower stage of said two-stage reactor, withdrawing reaction products of the calcium oxide and calcium carbonate with sulphur oxides, temperature quenching: (1) a first of said reaction products to effect a porous core of unreacted calcium oxide in an outer shell of cracked calcium sulphate, and (2) a second of said reaction products to effect a porous core of unreacted calcium carbonate in an outer shell of cracked calcium sulfate, resupplying, responsively to the sensed sulphur oxide, the first and second quenched reaction products to the reactor for additional reaction with sulphur oxides within the core regions of the quenched reaction products, and continuously emitting a desulphurized exit gas from said reactor to said heat exchanger means for cooling the exit gas, and communicating the exit gas to an exit.

16. The process for effecting continuous efficient desulphurization in accordance with claim 15, further comprising the step of providing subatmospheric pressure to assist said temperature quenching so that the first and second reaction products are withdrawn from the reactor and into temperature quenching means by means of vacuum pressure.

17. The process for effecting continuous efficient desulphurization in accordance with claim 15, further comprising the step of supplying said calcium oxide and calcium carbonate to said reactor by means of automatic feeder means.

18. The process for effecting continuous efficient desulphurization in accordance with claim 15, wherein the step of selectively supplying calcium oxide and calcium carbonate to the reactor includes computerized controller means operatively connected to sulphur oxide probe means in said reactor.

19. The process for effecting continuous efficient desulphurization in accordance with claim 18, further comprising the step of automatically controlling the withdrawal of the reaction products from said reactor and automatically controlling the resupplying of said reaction products to the reactor by means of the computerized controller.

20. The process for effecting continuous efficient desulphurization in accordance with claim 15, further comprising the steps of transmitting the exit gas through a cyclone separator and a particle removal device prior to exit.

21. The process for effecting continuous efficient desulphurization in accordance with claim 15, further comprising the steps of automatically controlling the withdrawal of the reaction products from said reactor and automatically controlling the resupplying of said reaction products to the reactor by means of a computerized controller.

22. The process for effecting continuous efficient desulphurization in accordance with claim 15, further comprising the step of supplying at least one of said reaction products to storage means.

23. A process for effecting the continuous and efficient desulphurization of gases containing sulphur oxides, comprising the steps of:
passing a flow of flue gas containing sulphur oxides gases through heat exchanging means to change the temperature thereof,
transmitting the heated flue gas through preheating means in order to further increase the temperature thereof,
passing the further heated flue gas through catalytic converter means in order to convert the sulphur dioxide therein to sulphur trioxide and resulting in a sulphur trioxide rich flue gas,
communicating the sulphur trioxide rich flue gas to said heat exchanging means in order to heat the incoming flue gas and cool the sulphur trioxide rich flue gas,
transmitting the sulphur trioxide rich flue gas to a reactor and providing a calcium containing reactant to the reactor,
withdrawing by subatmospheric pressure the reaction product of the reactant and sulphur oxides to means for temperature quenching the reaction product, the quenching means comprising a rotatably movable, substantially horizontally oriented cylinder at least partially submerged in a cooling medium,
quenching said reaction product to effect a porous core of unreacted reactant in an outer shell of cracked calcium sulphate,
resupplying the quenched reaction product to the reactor for additional reaction with sulphur oxides within the core region of the reaction product,
continuously emitting a desulphurized exit gas from said reactor to said heat exchanging means in order to effect the change in temperature of said incoming flue gas, and
transmitting said desulphurized exit gas to an exit.

24. A process for effecting the continuous and efficient desulphurization of gases containing sulphur oxides, comprising the steps of:
supplying and transmitting an inflow of flue gas containing sulphur oxides gases through heat exchanger means for changing the temperature thereof,
transmitting the heated flue gas through preheating means to further heat the flow of flue gas, and passing the inflow of preheated flue gas through a catalytic converter to provide heated sulphur trioxide rich flue gas,
passing the heated sulphur trioxide rich flue gas through the heat exchanger and means in order to cool the sulphur trioxide rich flue gas and increase the temperature of the inflow of flue gas,
communicating the cooled sulphur trioxide rich flue gas to a two-stage reactor,
continuously sensing the presence of a sulphur oxide within the reactor and in accordance therewith selectively supplying calcium carbonate to an upper stage and calcium oxide to a lower stage of said two-stage reactor,
withdrawing by subatmospheric pressure reaction products of the calcium oxide and calcium carbonate with sulphur oxides to temperature quenching means which comprises a rotatably movable, substantially horizontally disposed cylinder at least partially submerged in a cooling medium,
temperature quenching: (1) a first of said reaction products to effect a porous core of unreacted calcium oxide in an outer shell of cracked calcium sulphate, and (2) a second of said reaction products to effect a porous core of unreacted calcium carbonate in an outer shell of cracked calcium sulfate,
resupplying, responsively to the sensed sulphur oxide, the first and second quenched reaction products to the reactor for additional reaction with sulphur oxides within the core regions of the quenched reaction products, and
continuously emitting a desulphurized exit gas from said reactor to said heat exchanger means for cooling the exit gas, and communicating the exit gas to an exit.

* * * * *